Jan. 31, 1967   W. E. SCHWABE ETAL   3,301,061
PYROMETER

Original Filed May 15, 1963   3 Sheets-Sheet 1

INVENTORS
WILLIAM E. SCHWABE
JON A. CIOTTI
BY
ATTORNEY

NOTE:
SOLID LINE DENOTES PRIOR ART DEVICE
DASHED LINE DENOTES DEVICE OF PRESENT INVENTION

INVENTORS
WILLIAM E. SCHWABE
JON A. CIOTTI
BY
ATTORNEY

Jan. 31, 1967 W. E. SCHWABE ETAL 3,301,061
PYROMETER
Original Filed May 15, 1963 3 Sheets-Sheet 3

INVENTORS
WILLIAM E. SCHWABE
JON A. CIOTTI
BY
ATTORNEY

United States Patent Office 3,301,061
Patented Jan. 31, 1967

3,301,061
PYROMETER
William E. Schwabe and Jon A. Ciotti, Niagara Falls, N.Y., assignors to Union Carbide Corporation, New York, N.Y., a corporation of New York
Original application May 15, 1963, Ser. No. 280,670, now Patent No. 3,247,714, dated Apr. 26, 1966. Divided and this application Oct. 21, 1965, Ser. No. 514,159
6 Claims. (Cl. 73—359)

This application is a division of application Ser. No. 280,670, filed May 15, 1963 and now Patent No. 3,247,-714.

This invention relates to temperature-measuring apparatus. More particularly, this invention relates to a thermoelectric device for measuring elevated temperatures.

In many instances, because of highly corrosive conditions or very high temperatures, direct physical measurement of temperature is extremely difficult. Temperature measurements in such cases are usually attempted using optical pyrometers which rely on radiation from a hot body or environment the temperature of which is to be determined. Measurements obtained in this manner are not very reliable and are prone to errors because part of the radiation from the hot body can be absorbed by the atmosphere between the emitting body and the measuring device. In addition, in some instances the measurement cannot be made by an optical pyrometer because an unobstructed line of sight from the pyrometer to the target cannot be obtained. Furthermore, much protective equipment is necessary to shield the pyrometer itself from the hot environment.

With commonly used thermocouples temperatures up to about 1500° C., more or less, depending on the type of thermocouple, can be satisfactorily measured directly, provided the thermocouples are not exposed to corrosive conditions. At higher temperatures, for example, those encountered in a metal melting furnace, thermocouples are patently unsuitable for continuous measurements.

A temperature measuring device described in U.S. Patent 3,018,663 to G. E. Dunlop provides a partial solution to the aforementioned problems. This device utilizes a refractory bar having a linear longitudinal temperature gradient in conjunction with a pair of thermocouples. One end of the bar is exposed to the hot environment, the temperature of which is to be measured. The two thermocouples determine the temperature at two separate points along the bar and thereby measure the slope of the linear temperature gradient along the bar. Since the length of the refractory bar and its thermal conductivity are known quantities, the temperature at the hot end of the bar can be arrived at by extrapolation.

Such device functions well as long as the length of the refractory bar remains invariant. However, in corrosive surroundings such as encountered in a metal melting furnace, the refractory bar along with the furnace lining are eroded at a rapid rate thereby causing appreciable errors in the measurements. Frequent recalibration using an optical pyrometer may alleviate the problem to some extent but such corrective measures are cumbersome and the inherent shortcomings of reliance at least in part on an optical pyrometer are still present.

It is an object of this invention to avoid the difficulties encountered with an optical pyrometer and also to obviate the shortcomings of the prior art device which utilizes a refractory bar having a linear longitudinal temperature gradient.

It is a further object of this invention to provide a pyrometer for metal melting furnaces that operates on thermal conductivity principles and which has an attenuated susceptibility to variations in furnace wall or roof thickness.

It is another object to provide a reliable pyrometer having a relatively short response time to temperature variations.

Still other objects will readily present themselves to the skilled artisan upon reference to the ensuing specification and the drawings in which.

The objects of the present invention are achieved by a pyrometer which comprises a thermal probe in the form of an elongated, thermally-conductive, body which has a non-linear temperature gradient when conducting heat. One end of the body is adapted for exposure to a relatively hot environment the temperature of which is to be measured and the other end of the body is adapted for exposure to a relatively cold environment having a substantially constant temperature. The lateral surfaces of the body are thermally insulated from the surroundings so that the principal heat flow within the body is in an axial direction, i.e., from the hot end to the cold end. A thermoelectric device, preferably a thermocouple is used in conjunction with the body at a point intermediate the relatively hot and relatively cold ends for the purpose of measuring the temperature of the body at that point.

Figure 1:
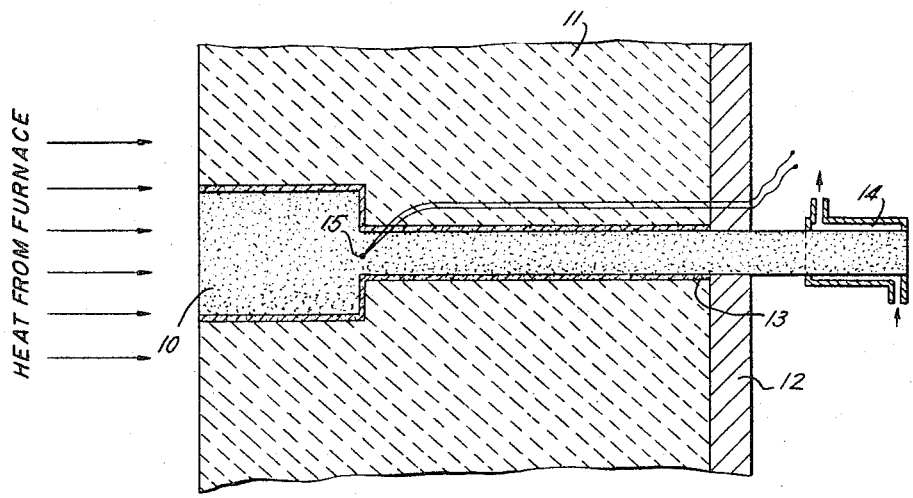
FIG. 1 is a fragmentary sectional view of a wall of a metal melting furnace showing the installation of the instant pyrometer.

Referring to FIG. 1, there is shown a thermal probe 10 made of a graphite rod and extending through the refractory brick lining 11 of a metal melting furnace. One terminal portion of the graphite rod 10, the end of which is exposed to the furnace heat, has a substantially larger cross-sectional area than the remaining portion of the rod 10. The ratio of the cross-sectional area of the relatively hot end of the probe to the relatively cold end of the probe should be at least about 2. The furnace shell is shown as 12.

The lateral surfaces of the thermal probe 10 are enveloped by an insulating material 13 suitably thermatomic carbon black. However, any high temperature insulating material such as cast alumina, ceramics, and the like can be employed. This arrangement assures that the principal heat flow within the probe is in the axial direction away from the relatively hotter end.

The relatively colder end of the probe 10 extends through the furnace shell 12 and is provided with a cooling gland 14. The cooling gland maintains the relatively colder end of the thermal probe 10 at a substantially constant temperature. Water is usually circulated through the cooling gland 14, however any other fluid coolant capable of maintaining a substantially constant temperature is suitable. Other cooling means such as thermoelectric cooling or steam cooling also are contemplated within the purview of this invention.

A thermoelectric device 15 is imbedded in the probe 10 for the purpose of determining the temperature of the probe at a predetermined point. Preferably this point is where the thermal gradient has a pronounced change in slope or a discontinuity of slope. In the illustrated embodiment of FIG. 1 this point is at the transition from a relatively larger to a relatively smaller cross-section of the thermal probe. The thermoelectric device normally is a thermocouple such as copper-constantan, Chromel-Alumel, platinum-platinum-rhodium, etc. Other thermoelectric devices such as graphite-boron or graphite-silicon carbide couples can also be employed. The selection of a particular thermoelectric device is primarily dependent on the expected maximum temperatures at the point of measurement and also on cost.

While one thermoelectric device is satisfactory, more than one can also be employed. In some instances it has been found advantageous to employ a number of thermocouples or a thermopile at the point of measurement. Also, additional thermocouples can be located longitudinally along the probe in order to more closely ascertain the nonlinear temperature gradient; however, usually this is not necessary.

Figure 2:
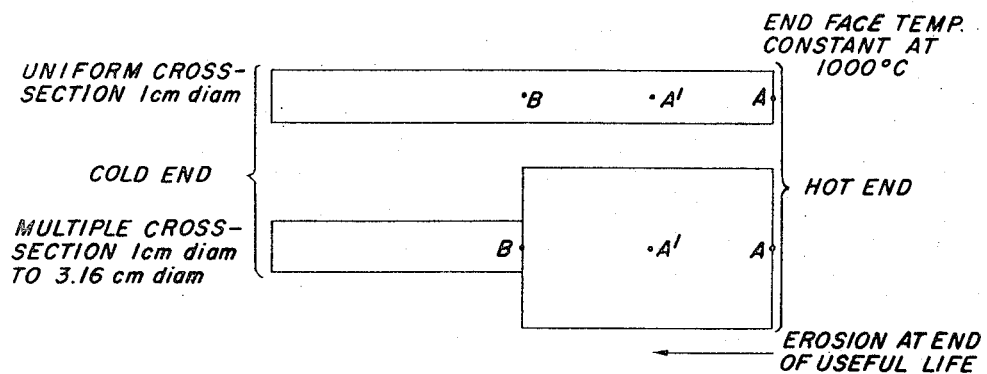
FIG. 2 is a graph showing comparative temperature measurements of the instant pyrometer and a prior art device employing a refractory bar having a linear longitudinal temperature gradient.
Figure 2:
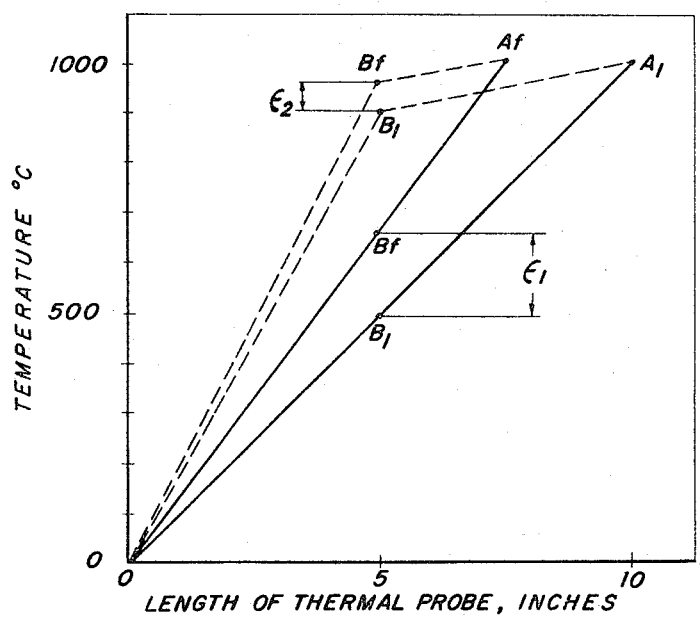

FIG. 2 illustrates the striking difference between a typical pyrometer of the present invention and the prior art devices. Two graphite thermal probes, one having a linear temperature gradient and the other having a non-linear temperature gradient, as shown in the graph of FIG. 2, were imbedded in a similar manner in the wall of a metal melting furnace substantially as taught herein. The hot end face of each of the probes was maintained at about 1000° C. at all times. This temperature is indicated at the points $A_i$ on the graph. The cold ends of both thermal probes were maintained at about 0° C. at all times. A $Pt$-$PtRh$ thermocouple was situated within each probe at the point B. This thermocouple was used to measure the temperature of the probe at that point. The initial temperatures at point B for each probe are indicated by the points $B_i$ on the graph. The final temperatures, i.e., the temperatures at the end of the useful life of the thermal probes, at point B for each probe are indicated by the points $B_f$ on the graph. The overall temperature gradients for the prior art probe having a linear temperature gradient are indicated by solid lines and those for the thermal probe of the instant pyrometer, i.e., the probe having a non-linear temperature gradient, are indicated by interrupted lines.

Reference to the graph of FIG. 2 indicates that the initial temperature of the prior art probe at point B was 500° C., i.e., $B_i$=500. Since the end face was known to be at 1000° C., i.e., $A_i$=1000° C., the multiplier for this probe is 1000/500 or 2.

For the probe of the present invention the initial temperature at point B was 900° C., i.e., $B_i$=900° C. Since the end face of the probe in this instance was also at 1000° C., i.e., $A_i$=1000° C., the multiplier for the instant probe is 1000/900 or 1.11.

The multiplier is a factor to be applied to the temperature measurement at B so as to obtain the end face temperature at A.

Both thermal probes were subjected to normal erosion in a metal melting furnace. At the end of the useful life of both the thermal probes and the furnace lining a final set of temperature readings was taken. For the prior art probe the temperature at B, indicated as $B_f$ on the graph, was measured at 610° C. which corresponds to an apparent temperature of 610° C.×2 or 1220° C. at the end face A′. Since the end face of both thermal probes was maintained at 1000° C. at all times, the reading represents an error of 220° C. or 22%. Graphically this error is indicated by $\epsilon_1$ in FIG. 2.

In contrast thereto, the temperature at point B of the instant probe, shown as $B_f$ on the graph, was measured as 950° C. which corresponds to an apparent temperature of 950° C.×1.11 or 1055° C. at the end face A′. This reading represents an error of 55° C. or 5.5%. Graphically this is indicated by $\epsilon_2$ in FIG. 2.

The measurement errors can be further reduced by choosing a multiplier which will indicate the true hot end temperature at an intermediate erosion stage. For example, if, after calibration in the above example, the multiplier is chosen as 1.08 rather than 1.11, the measurement error becomes ±2.75%.

Comparing the temperature measurements obtained by both thermal probes it is readily apparent that in the pyrometer of the present invention errors introduced because of erosion of the thermal probe are reduced by about 75%. The response delay time for the instant pyrometers between the hot face temperature and a thermocouple situated in the instant probe at about the midpoint between the hot face and the furnace shell was observed to be in the range from about 15 to about 50 seconds. This response delay time is adequate for signaling the necessary power input changes for a metal melting furnace.

Figure 3:
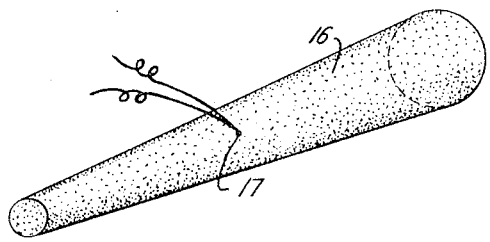
FIG. 3 is an isometric view of a thermal probe employing a tapered thermally-conductive rod.

FIG. 3 shows an embodiment of the present invention where the non-linear thermal gradient is obtained with a tapered, thermally-conductive rod 16. In this embodiment the ratio of the hot-end cross-sectional area to the cold-end cross-sectional area should be at least about 2. A thermocouple imbedded in the thermal probe is shown at 17.

Figure 4:
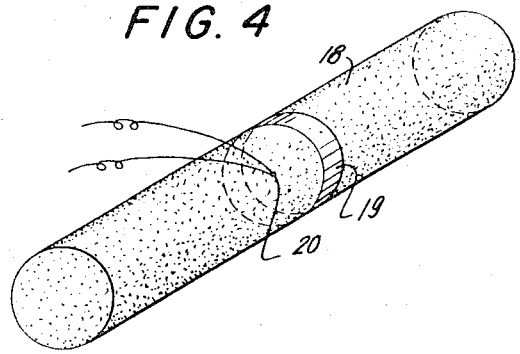
FIG. 4 is an isometric view of a thermal probe for the instant pyrometer employing a thermally-conductive rod having a partial heat barrier therein.

FIG. 4 shows another embodiment of the instant pyrometer where the thermal probe is a thermally-conductive rod 18 of uniform cross-section but provided with a heat barrier at 19. The heat barrier can be an asbestos insert, a carbon insert, a ceramic insert, or the like. A thermocouple 20 is imbedded in the rod at an intermediate point between the cold end of the rod 18 and the heat barrier 19. Preferably, the thermocouple 20 is near the heat barrier 19.

A further embodiment of FIG. 4 comprises a series of two or more materials, optionally separated by heat barriers, but at all times providing a thermally-conductive path from the hot end of the thermal probe to the cold end of the thermal probe.

Figure 5:
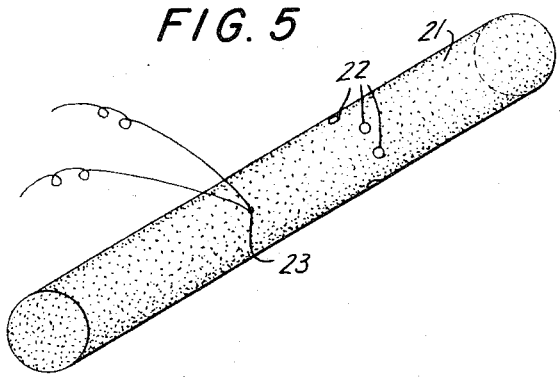
FIG. 5 is an isometric view of a thermal probe having a reduced thermally-conductive cross-section at an intermediate point of the probe.

FIG. 5 shows a still further embodiment of the present pyrometer. The thermal probe is a thermally-conductive rod 21 provided with a locally reduced cross-section for heat conduction at 22. This reduction in cross-section is achieved by drilling holes substantially normal to the longitudinal axis of the probe 21. A thermocouple 23 is provided within the probe 21 at a point intermediate the reduced cross-section 22 which acts essentially as a heat barrier and the cold end of the probe.

Figure 6:
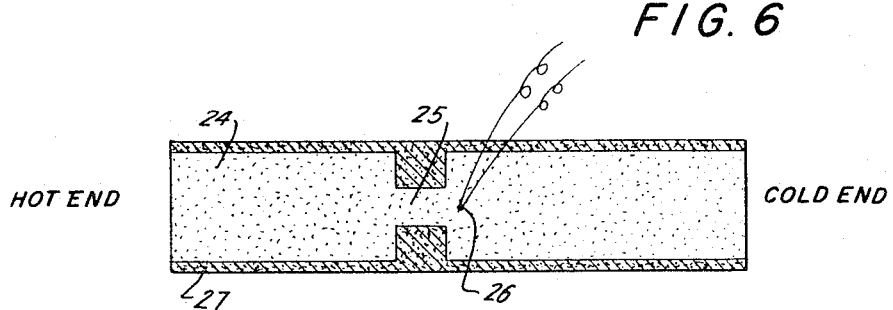
FIG. 6 is a longitudinal section view of another thermal probe having a reduced thermally-conductive cross-section at an intermediate point of the probe.

FIG. 6 shows another embodiment wherein a thermally-conductive rod 24 is provided with a locally reduced cross-section for heat transmission 25. The reduction is achieved by machining an intermedidate portion of the rod 24 to a smaller diameter. A thermocouple 26 is provided within the rod 24 at a point intermediate the reduced cross-section 25 and the cold end of the rod. A layer of thermal insulation 27 is shown enveloping the lateral surfaces of the rod 24.

Prior to operation the pyrometer is calibrated by comparison with an independent measuring device. Charts can be prepared which correlate the E.M.F. output of the thermoelectric device imbedded within the thermal probe with the actual temperature of the hot end face or other similar calibrating means known to those skilled in the art.

The instant pyrometer has been described herein with particular reference to its use in a metal melting furnace. It is to be understood, however, that the instant device is equally well adapted for measurements of elevated temperature in a wide variety of applications without departure from the spirit and scope of this invention.

Similarly, the thermal probes for the instant pyrometer have been described with particular reference to graphite as the thermally-conductive material. Nevertheless, other thermally-conductive materials such as silicon carbide, and the like or even metals, for example, copper, nickel, steel, etc., can also be employed. The selection of the particular materials is governed by their adaptability to the corrosive conditions encountered and their capability to establish a non-linear temperature gradient when conducting heat.

We claim:

1. A pyrometer comprising an elongated thermally-conductive body having an overall non-linear temperature gradient when conducting heat axially and having first and second terminal portions disposed at opposite ends of said body, the first terminal portion possessing a higher thermal conductance than the remainder of said body and the end face of the first terminal portion being adapted for exposure to a relatively hot environment, and the second terminal portion being adapted for exposure to a relatively cold environment of substantially constant temperature; insulating means contiguous with said body and arranged so that the principal heat flow within said body is in an axial direction; and at least one temperature-sensing device in conjunction with said body for measuring the temperature of said body at an intermediate point between the aforesaid terminal portions.

2. A pyrometer comprising an elongated body having a continually decreasing thermal conductance in the axial direction, the end of said body having the relatively higher thermal conductance adapted for exposure to a relatively hot environment and the end of said body having the relatively lower thermal conductance adapted for exposure to a relatively cold environment of substantially constant temperature; insulating means contiguous with said body and arranged so that the principal heat flow within said body is in the direction of decreasing thermal conductance and at least one thermoelectric device capable of generating a specific electromotive force in response to a particular temperature imbedded in said body at a point intermediate said ends of said body.

3. A pyrometer comprising an elongated, thermally-conductive body having an overall non-linear temperature gradient when conducting heat axially and having consecutive portions of decreasing thermal conductance, the end face of the portion having the highest thermal conductance being adapted for exposure to a relatively hot environment and the end of the portion having the lowest thermal condductance adapted for exposure to a relatively cold environment of substantially constant temperature, insulating means contiguous with said body and arranged so that the principal heat flow within said body is in the axial direction, and at least one thermoelectric device capable of generating a specific electromotive force in response to a particular temperature imbedded in one of said portions but other than that having the highest thermal conductance.

4. A pyrometer comprising a graphite rod, a terminal portion of which has a cross-sectional area at least about twice that of the remaining portion of said rod, the end having the larger cross-sectional area being adapted for exposure to a relatively hot environment and the end having the lesser cross-sectional area being adapted for exposure to a relatively cold environment or substantially constant temperature; insulating means contiguous with said rod and arranged so that the principal heat flow within said rod is in the axial direction; and at least one thermocouple imbedded at the transition from a relatively larger to a relatively smaller cross-section area of said rod.

5. A pyrometer for measuring the temperature of a metal melting furnace comprising, the combination with a refractory wall of said furnace of an elongated, thermally-conductive body, extending through the furnace wall, having an overall non-linear temperature gradient when conducting heat axially, and having first and second terminal portions disposed at opposite ends of said body, the first terminal portion possessing a higher thermal conductance than the remainder of said body and the end face of the first terminal portion being adapted for exposure to the furnace interior, and the second terminal portion being adapted for exposure to a relatively cold environment of substantially constant temperature; insulating means contiguous with said body and arranged so that the principal heat flow within said body is in an axial direction; and at least one temperature-sensing device in conjunction with said body for measuring the temperature of said body at an intermediate point between the aforesaid terminal portions.

6. A pyrometer for measuring the temperature of a metal melting furnace comprising, the combination with a refractory wall of said furnace, of a graphite rod extending through the furnace wall and having a terminal portion which is exposed to the furnace interior and is of a diameter at least about twice that of the remaining terminal portion of said rod; insulating means contiguous with said graphite rod and arranged so that the principal heat flow within said rod is in the axial direction; and at least one thermocouple imbedded in a portion of said rod intermediate the aforementioned terminal portions the end of the rod having the relatively lesser cross-sectional area being adapted for exposure to a relatively cold environment of substantially constant temperature.

References Cited by the Examiner

UNITED STATES PATENTS

| 2,660,061 | 11/1953 | Lewis | 73—359 |
| 2,655,550 | 10/1953 | Zvanut | 136—234 X |
| 3,018,663 | 1/1962 | Dunlop | 73—343 |

LOUIS R. PRINCE, *Primary Examiner.*

D. M. YASICH, *Assistant Examiner.*